(12) United States Patent
Pochapsky et al.

(10) Patent No.: US 7,333,270 B1
(45) Date of Patent: Feb. 19, 2008

(54) DUAL BAND NIGHT VISION DEVICE

(75) Inventors: Eugene Pochapsky, Cheswick, PA (US); Scott Keitzer, Export, PA (US)

(73) Assignee: OmniTech Partners, Freeport, PA (US)

( * ) Notice: Subject to any disclaimer, the term of this patent is extended or adjusted under 35 U.S.C. 154(b) by 28 days.

(21) Appl. No.: 11/150,377

(22) Filed: Jun. 10, 2005

(51) Int. Cl.
*G02B 27/14* (2006.01)

(52) U.S. Cl. .................. 359/634; 359/352; 359/353; 359/354; 250/330; 250/332; 250/333; 42/111

(58) Field of Classification Search ............ 359/353, 359/634, 352, 354; 250/333, 330, 332; 42/111
See application file for complete search history.

(56) References Cited

U.S. PATENT DOCUMENTS

| | | | |
|---|---|---|---|
| 5,035,472 A * | 7/1991 | Hansen | 359/350 |
| 5,898,519 A | 4/1999 | Palmer | |
| 6,608,298 B2 | 8/2003 | Gaber | |
| 6,624,414 B1 | 9/2003 | Glesener | |
| 6,646,799 B1 | 11/2003 | Korniski et al. | |
| 6,724,131 B2 | 4/2004 | Iosue | |
| 6,747,258 B2 | 6/2004 | Benz et al. | |
| 6,765,352 B2 | 7/2004 | Ohtomo et al. | |
| 6,909,539 B2 | 6/2005 | Korniski et al. | |
| 6,911,652 B2 | 6/2005 | Walkenstein | |
| 2005/0205784 A1 | 9/2005 | Korniski et al. | |

OTHER PUBLICATIONS

Brandon Holloway, "Thermal Imaging".
Thermal Imaging, seussbeta.tripod.com/imaging and www.darpa.mil.
Sixto Ortiz, Jr., "New Monitor Technologies Are on Display", Industry Trends, 2003.
Conrad H. Bickenstorfer, Ph.D., "Emerging Display Technologies, Californian high-tech company's innovation makes flexible OLED displays possible", 1995-2003, Pen Computing Magazine, Inc.
www.kodak.com, "What is Oled"?
www.sciam.com, Organic Light-Emitting Diode (OLED) technology.
http://oemagazine.com, "What is an All Active Matrix Display?"

* cited by examiner

*Primary Examiner*—Hung X. Dang
*Assistant Examiner*—Joseph Martinez

(57) ABSTRACT

A night vision device provides both an amplified visible light image and an infrared image, overlayed upon each other so that they appear to be a single image. A user may select to utilize either an intensified visual image only, an infrared image only, or ratios of both images simultaneously. Dichroic surfaces within the night vision device are utilized first to separate light into visible and infrared portions, and then to recombine the visible and infrared images to a single image.

36 Claims, 7 Drawing Sheets

DUAL BAND NIGHT VISION DEVICE

BACKGROUND OF THE INVENTION

1. Field of the Invention

The present invention relates to night vision devices. More specifically, the present invention provides a night sight for use with a telescopic day sight, capable of providing imagery in the visible light and/or infrared wavelength bands.

2. Description of the Related Art

The use of a light source to illuminate the target—whether visible light or near-infrared—has the disadvantage of indicating the location of the shooter. Laser aiming devices carry the same disadvantage. Thermal infrared imaging, which does not require a light source, has the disadvantage of producing an unnatural image. Light gathering and intensifying night vision devices produce natural images, but are only useful to the extent that there is available light to gather light and intensify. The use of tritium illuminated sights, while making the sights more visible, fails to illuminate the target even if the tritium—illuminated aiming reticle is within a telescopic sight providing light gathering and magnification. Accordingly, both light gathering and intensifying night vision devices, and infrared night vision devices capable of being used as a firearm sight have been developed with the understanding that the use of each would be dictated by their various advantages and disadvantages as applied to various situations.

A typical night vision sight utilizes an objective lens having a maximized size for maximum light gathering capability. After passing through the objective lens, light passes through a focusing assembly that is used to vary the distance light travels between lenses within the sight by moving either a focal length adjust lens with respect to the objective lens, or a mirror within the night vision device along an axis to change the length of the light path. The light will therefore be brought into sharp locus on the photosensitive surface of the image intensifier.

A photocathode having an electrical current flowing therethrough which forms the photosensitive surface of the image intensifier converts the optical image into an electronic image that is transmitted through an electron flow. The electrons are accelerated through the image intensifier, and remain focused because of the close proximity of surfaces within the image intensifier tube. Acceleration of the electrons, combined with a microchannel electron-multiplying plate, result in intensification of the original image. When the electrons reach a screen, the electronic image is converted to an optical image. The final, amplified visible image is displayed to the shooter or to other optical devices within the night sight.

The output image of the image intensifier may be presented to a collimator. The collimator presents the image to the shooter in a manner so that it appears to originate from a long distance, analogous to an unaided day sight. The orientation of the collimator affects the degree to which the image transmitted by the collimator appears to originate from the same angle at which it entered the objective lens.

Some night sights attempt to combine a daytime telescopic scope and a night sight into the same sight. Many of these devices use two optical paths, one used during the day, and one for use at night. In addition to making the sight unnecessarily heavy, the use of two optical paths creates a likelihood of differences between point of aim and point of impact from one optical path to the other.

Other night vision devices utilize a removable image intensifier tube to permit use of the night sight as a day sight. However, image intensifier tubes are delicate instruments, subject to damage when removed. Furthermore, a temperature difference between the image intensifier and the scope upon insertion of the image intensifier may cause fogging of the sight.

Other night vision sights utilize an image intensifier moved within the housing from a position within the sight's light path to a position outside the sight's light path depending on whether the sight is being used during the day or at night. Such systems may also require the movement of the objective lens and the eye piece lens assembly in conjunction with the image intensifier tube so that the daytime optics move outward as the image intensifier tube is moved therebetween, thereby maintaining the proper focal distance for the daytime optics. Such movement of both the daytime optics and the image intensifier tube raises the issue of the repeatability of these movements.

In all prior night sights known to the inventors, it was necessary to select either a sight using intensified visible light, or a sight using infrared. Given the advantages and disadvantage of infrared and visible light amplification, there is a need for a single night vision device having both infrared and visible light amplification capability. There is a further need for a night vision device permitting the user to select either visible light amplification or infrared, or a combination of both, depending upon the user's specific circumstances. There is an additional need for a night vision device that may provide fused images (electronically enhanced combined images) or blended images (combined but otherwise unprocessed images), giving the makers and users of such night vision devices the ability to maximize the usefulness of the images produced by the night vision device.

SUMMARY OF THE INVENTION

The present invention provides a night vision device providing an intensified visible light image having an infrared image overlayed over the visible light image so that both images appear to be a single image. Some preferred embodiments permit the user to selectively view either the visible light image only, the infrared image only, or mixtures of both images simultaneously. The night sight is assembled in a manner that ensures that an image viewed through the night sight appears to originate from substantially the same angle at which the image entered the objective lens, thereby further resisting parallax. A projected image appears to originate from substantially the same angle at which it entered the objective lens if the angle at which the image entered the objective lens and the angle at which the image appears to originate to a shooter viewing the image through the night sight are sufficiently close so that, at normal shooting distances, a shooter need not adjust his point of aim as a result of the difference in the angles.

The night vision device includes a multispectral objective lens structured to transmit and focus both visible/near infrared light and infrared light. After light passes through the multispectral objective lens, it is directed towards a dichroic device structured to separate light into visible/near infrared light and infrared light. In some preferred embodiments, the dichroic device will be a dichroic secondary located within a central obscured area of the objective lens, and light passing through the objective lens will be directed toward the dichroic device by a mirror.

Visible/near infrared light is directed by the dichroic device to an image intensifying assembly, possibly by being reflected from the dichroic device towards the image intensifying assembly. Prior to reaching the image intensifying assembly, the visible/near infrared light preferably passes through a focusing assembly having at least one focus lens mounted within an adjustment device. In a preferred embodiment, the focus lens is mounted within a tube that is slidably mounted within a focus sleeve. The interaction of the focus lens tube and focus sleeve is structured to minimize image shift caused by shifting, tilting, or rotation of the focus lens tube within the focus lens sleeve. The clearance between these two components is sufficient to allow the focus lens tube to slide within the focus sleeve, while minimizing tilting of the focus lens tube. The surface finish of the exterior of the focus lens tube and the interior of the focus sleeve is sufficiently smooth to facilitate sliding. Sliding is further facilitated by using materials of different hardness or lubricity for these components. Use of a low diopter focus lens decreases the sensitivity of the focusing assembly to tilt, rotation, or decentration of the focus lens. The focus lens tube and focus sleeve are lengthened with respect to prior art devices, thereby further minimizing the maximum angle at which the focus lens tube may tilt at a given clearance between the focus lens tube and the focus sleeve. The focus lens is moved linearly as needed to bring the image into sharp focus on the photocathode of the image intensifier.

The photocathode which forms the photosensitive surface of the image intensifier converts the optical image into an electronic image that is transmitted through an electron flow. The electron flow is amplified by a microchannel plate and proximity focused to a phosphor screen. The amplified electronic image is then converted back to an optical image by the phosphor screen. The final, amplified visible image is displayed on the inverted fiber optic output display. The image intensifier thereby forms an amplified, upright visible version of the image on its inverting fiber optic output display, which then presents the image to the collimator.

The image intensifier is rigidly restrained within an image intensifier mount, wherein the image intensifier is suspended by an elastomer in a rigid shell, with sufficient thickness to allow the image intensifier to be rigidly held without sagging, and to resist movement due to temperature changes and deformation of the image intensifier within its sleeve. Suspending the image intensifier using the elastomer also protects the image intensifier from shock. The use of the elastomer within the sleeve permits the use of a high mounting force, by distributing the force over the entire surface of the tube, thereby ensuring that the image intensifier remains precisely located in the correct position within the housing.

Other sensor/display combinations may function as an image intensifying assembly. Preferred sensor/display combinations including an image intensifier, an uncooled infrared detector array, a cooled infrared detector array, a lead salt detector array, a SWIR detector array, a visible band CCD array, or an intensified CCD or CMOS array having direct, fiber, or optical coupling. The display portion of the combination may be an inverting fiber optic output display, an LCD display, a micro mirror array, a CRT, a plasma display, or an OLED display.

Infrared light is directed by the dichroic device towards an infrared camera. Some preferred embodiments of the dichroic device are transparent to infrared light, so that as visible/near infrared light is reflected off the dichroic device, infrared light passes through the dichroic device towards an infrared camera. The infrared camera may be located directly behind the dichroic device, or may be located in a position within the night vision device where light passing through the dichroic device may be directed towards it by a mirror. The infrared camera is operatively connected towards a display that may be of the same type as the display for the image intensifying assembly, and may in some embodiments be the same display, with the images from the image intensifying assembly and infrared camera electronically overlayed. Additionally, the infrared image and visible light image could be optically fused using such a combined display.

In a more preferred embodiment, the display for the image intensifying assembly and the infrared display are separate displays, having images that are combined using a beam combiner. A preferred beam combiner includes a dichroic surface that is transparent to some visible wavelengths, for example, green, and reflective to other visible wavelengths, for example, wavelengths other than green. The image transmitted by the image intensifying assembly is typically green, so this image may be combined with an image from the infrared display by transmitting the green image through the dichroic surface, while reflecting the image of the infrared display off of the dichroic surface in a manner so that the two images are overlayed, appearing as a single image. Preferred embodiments of the infrared image display are mounted within a spherical bearing that interacts with a spherical seat secured within the housing. The infrared display may therefore be moved by sliding the spherical bearing with respect to the spherical seat, and then securing the display in a position wherein the images are overlayed.

The combined image from the image intensifier display and the infrared display may be directed towards a collimator, causing the image to appear as though it originated from a long distance. The collimator is fitted within a spherical bearing that is centered at the center of curvature of the image intensifier's concave output surface. The use of the spherical bearing permits adjustment of the angle at which the displayed image appears to emerge from the collimator during assembly, so that the projected image appears to originate from substantially the same angle at which it entered the objective lens. The focal length adjust lens is adjusted during assembly to match the objective lens focal length and to compensate for any magnification within the image intensifier so that the magnification is exactly unity and the projected image appears to emerge from substantially the same angle at which it entered the objective lens for any relative orientation of the night sight and daytime telescopic sight. Those skilled in the art will realize that other techniques can be incorporated to align the described system, including, but not limited to fiber bundles, translating refractive elements, and prisms.

A preferred embodiment of the night vision device is a night sight that may be mounted directly in front of a daytime telescopic sight by attaching a mount on the night sight's housing to a universal sight rail. Universal sight rails such as Weaver rails are commonly provided on firearms. The center line of the night sight is said to be substantially the same as the typical centerline of a conventionally mounted daytime telescopic sight. However, because the magnification within the night sight is unity, and because the night sight is assembled in a manner that ensures that a projected image appears to originate from substantially the same angle at which it entered the objective lens, perfect alignment with the daytime telescopic sight is not essential, because an image passing through the night sight will continue to appear to originate from its actual originating point. Therefore, the same point of aim may be utilized regardless of whether the night sight is present in front of the daytime telescopic sight, permitting the night sight to be installed and removed without the need to re-sight in the weapon. Other alternative night vision devices may be stand alone night vision devices for viewing only, or night sights incorporating an aiming reticle therein, without the need for an additional sight.

It is therefore an object of the present invention to provide a night sight capable of displaying an intensified visible light image, an infrared image, or both images overlayed upon each other to appear as a single image.

It is another object of the invention to provide simultaneous or individually selectable images in multiple wavelengths band with no parallax between channels or registration error between channels.

It is a further object of the invention to provide a night sight for use with a daytime telescopic sight that does not introduce any parallax into the sight picture through the daytime telescopic sight.

It is another object of the invention to provide a night sight that may be installed and removed on a weapon in front of a daytime telescopic sight without the need to adjust the aiming point of the daytime telescopic sight.

It is a further object of the invention to provide a night sight that may be used in conjunction with a daytime telescopic sight without the need for perfect alignment between the night sight and daytime telescopic sight.

It is another object of the invention to provide a night sight having substantially the same centerline height as a daytime telescopic sight with which it is used, thereby avoiding the introduction of parallax into the system, and reducing the cross-section of the weapon that is viewable by a down range observer.

It is a further object of the invention to provide a night vision device capable of producing images with the maximum theoretical resolution and modulation transfer function for a given lens aperture diameter.

It is another object of the invention to provide a common aperture lens capable of maximizing the total imaged energy in each wavelength band for the given lens aperture diameter.

It is a further object of the invention to provide scene imagery that permits simultaneous improved target detection and target aimpoint based on providing blended multispectral imagery in a common aimpoint device.

It is another object of the invention to provide image intensified scenes at full image intensifier resolution through the use of optical image fusion.

These and other objects of the invention will become more apparent through the following description and drawings.

BRIEF DESCRIPTION OF THE DRAWINGS

Like reference characters denote like elements throughout the drawings.

DETAILED DESCRIPTION OF THE PREFERRED EMBODIMENTS

The present invention provides a night vision device capable of producing an intensified visible light image, an infrared image, or both images overlayed upon each other to appear as a single image.

Figure 1:
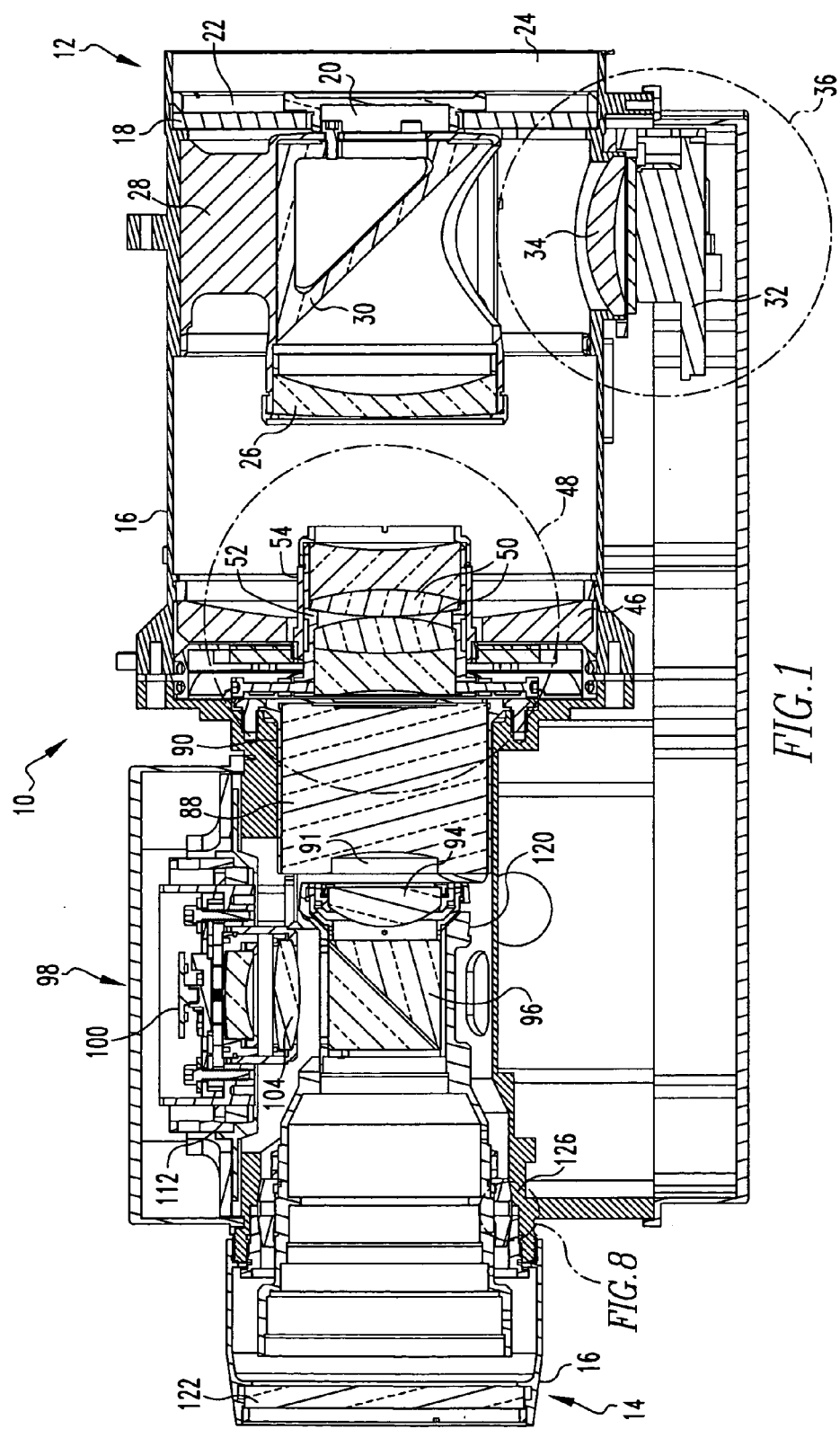
FIG. 1 is a cross-sectional side view of a night sight according to the present invention.

Referring to FIG. 1, a night vision device 10 is illustrated, with the illustrated example being a night sight for a firearm. The night sight 10 includes a forward end 12 which faces the target in use, and the back end 14 through which a shooter or other user may view an image through the night vision device 10, possibly through a daytime telescopic sight. A housing 16 holds the components of the night vision device 10. A multispectral objective lens 18 is secured within the forward end 12. Preferred embodiments of the multispectral objective lens 18 are catadioptric lenses that include a central obscured area 20 surrounded by a usable area 22, but alternative layouts within the forward end 12 of the housing 16 permit the use of refractive objective lens elements. A multispectral objective lens element 24 may be included in front of the multispectral objective lens 18, to facilitate a weatherproof seal at the forward end 12 and/or to alter the properties of light passing through the lens 24.

A dichroic device 26, which may be a dichroic plate beam splitter, a dichroic cube beam splitter, or the illustrated dichroic secondary lens, is preferably secured behind the obscured area 20 of the multispectral objective lens 18, possibly by the spider 28. The dichroic device 26 in other embodiments may be placed at any point common to both the infrared and visible light paths within the objective lens 18. The dichroic device 26 is coated with a thin film coating that reflects some wavelengths of light, and transmits other wavelengths of light. In the illustrated example, visible and near infrared light is reflected, and infrared light is transmitted. Preferred dichroic coatings include thin film dielectric, ion beam assisted deposition hard dielectric, chemical vapor deposition (CVD) coatings and rugate filters. Although only one dichroic device 26 is shown in the illustrated example, multiple dichroic devices 26 could be used to split up more than two wavelengths of light. In a preferred embodiment, a fold mirror 30 is disposed between the dichroic device 26 and obscured area 20. The fold mirror 30 is structured to direct light passing through the dichroic device towards an infrared camera 32, which in the illustrated example is located in the bottom of the forward end 12 of the housing 16. The infrared camera may be a thermal infrared camera or a short wave infrared (SWIR) camera. The infrared camera is supported by a focusing assembly which will be described in further detail below. A focusing lens 34 is disposed between the fold mirror 30 and infrared camera 32, so that moving the infrared camera towards or away from the focusing lens 34, or moving the lens with respect to the infrared camera will focus the image received by the infrared camera 32.

Figure 2:
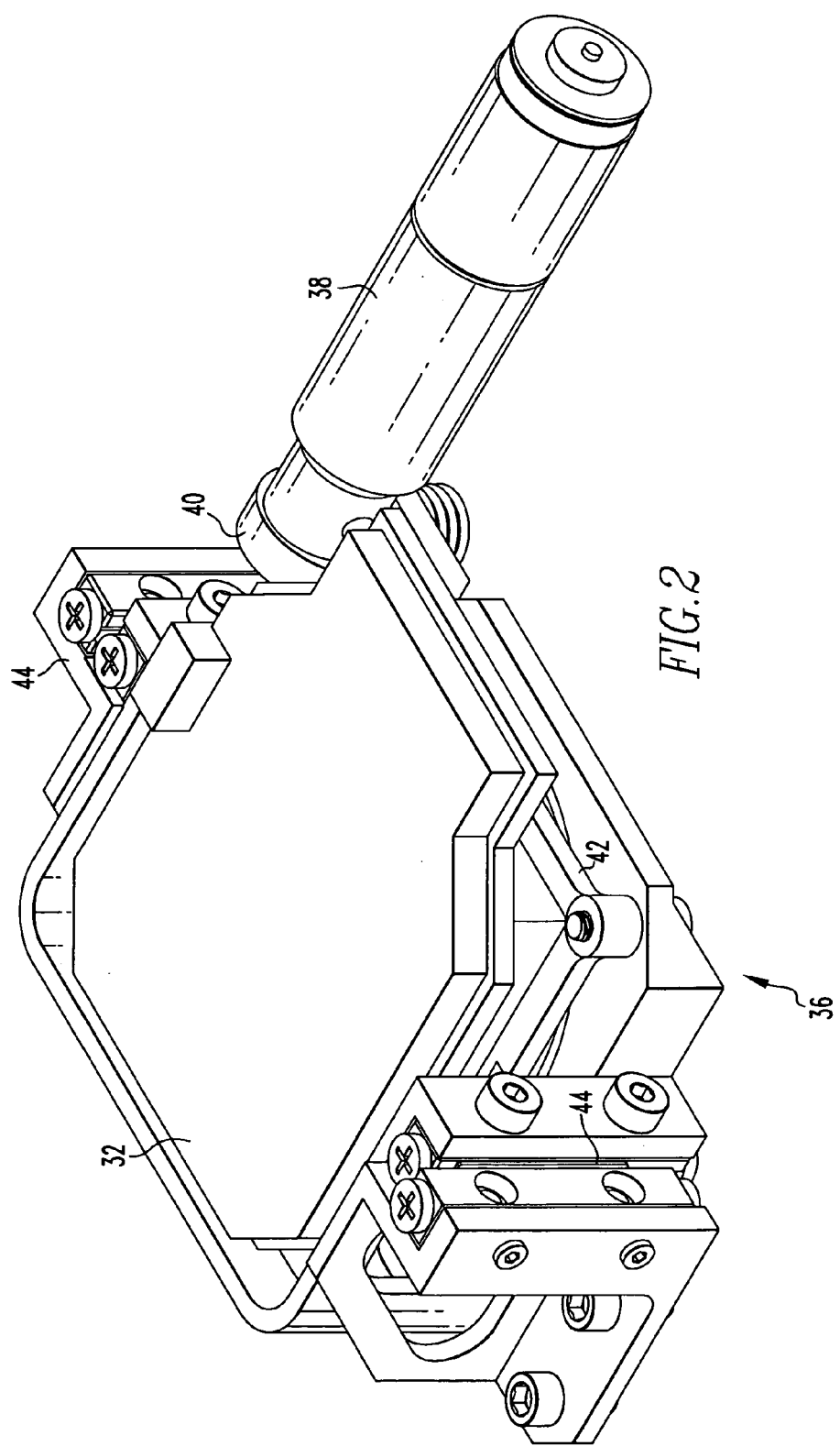
FIG. 2 is a top isometric view of an infrared focusing assembly for a night sight according to the present invention.

Referring to FIG. 2, a focusing assembly 36 for the infrared camera 32 is illustrated. The focus assembly 36 includes a focus motor 38 operatively connected to a focus cam 40, which converts the rotational motion of the motor 38 into a linear motion of the microbolometer 42 of the infrared camera 32. The vertical motion of the microbolometer 42 is guided by a pair of linear bearings 44. Actuation of the focus motor 38 thereby causes the micro-bolometer 42 to move closer to or away from the focus lens 34, thereby bringing an image reflected off of the fold mirror 30 into focus on the infrared camera 32. Alternatively, the motor 38 may be replaced by a manual focusing device such as a standard focusing shaft and knob. As another alternative, the focus lens 34 may be moved instead of the micro-bolometer 42 to focus the infrared image.

Figure 3:
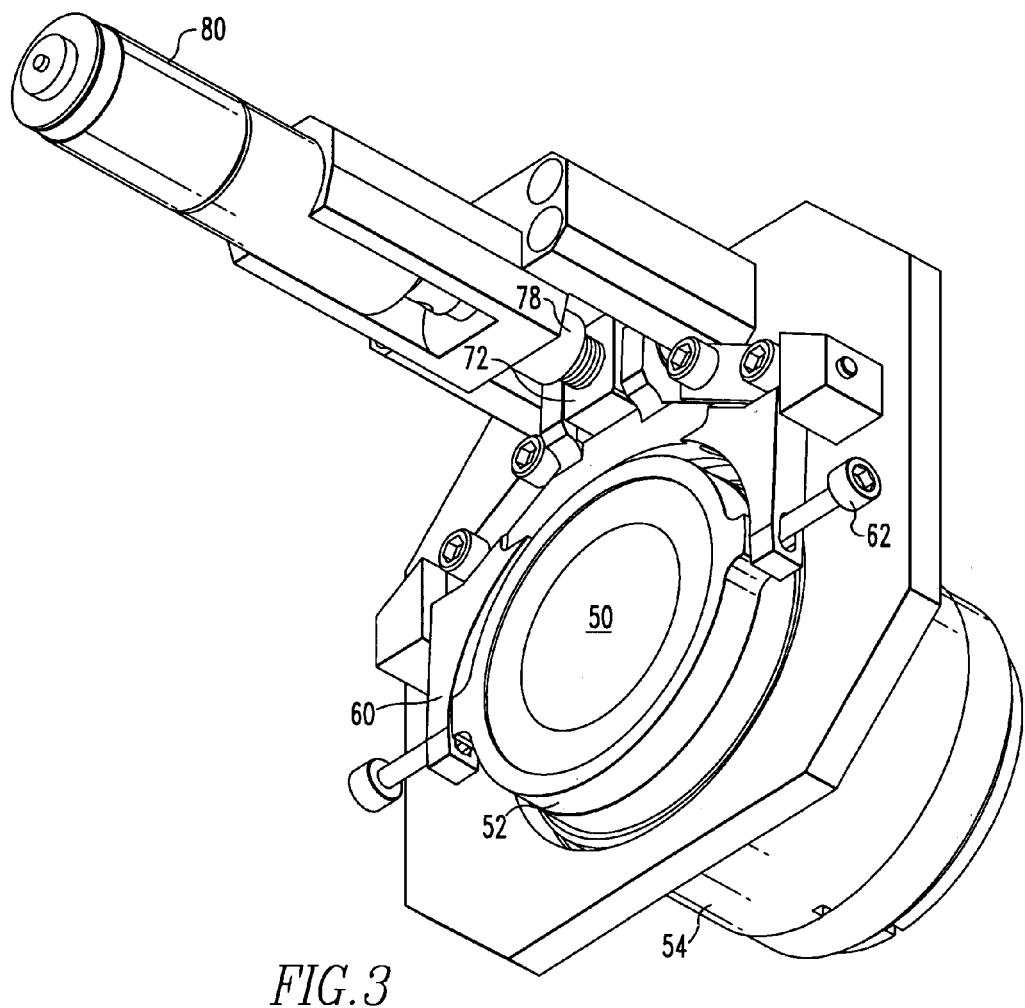
FIG. 3 is a front isometric view of a visible light focusing assembly for a night sight according to the present invention.
Figure 4:
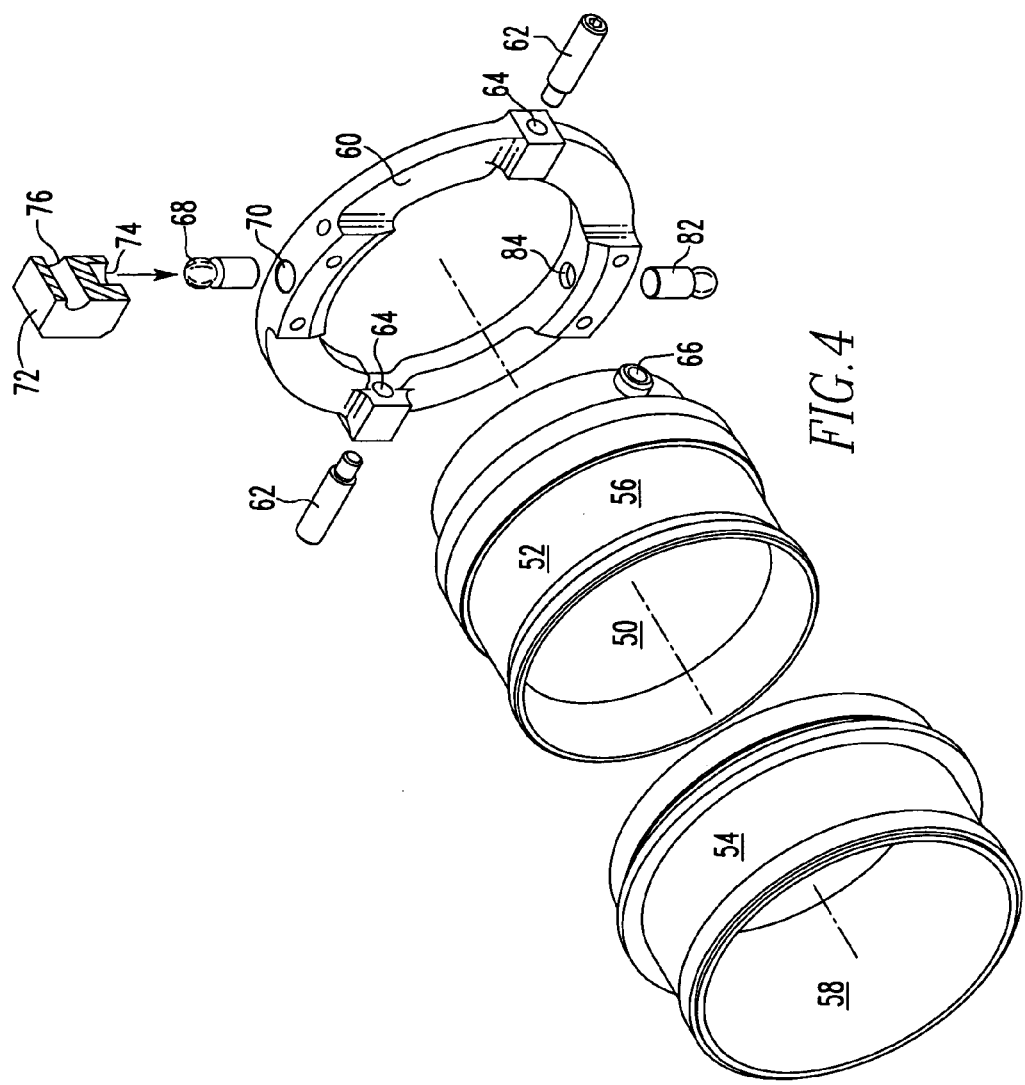
FIG. 4 is an exploded isometric front and side view of a focusing assembly for a night sight according to the present invention.

Moving back along the housing 16 of the night vision device 10, a primary mirror 46 surrounds a centrally mounted visible/near infrared focusing assembly 48. The primary mirror 46 is structured to reflect all light passing through the multispectral objective lens 18 towards the dichroic device 26, which allows infrared light to pass through to be reflected towards the infrared camera 32, and which reflects visible/near infrared light back towards the visible/near infrared focusing assembly 48. The focusing assembly 48 is best illustrated in FIGS. 3 and 4. The focusing assembly 48 includes at least one focus lens 50 mounted within a focus lens tube 52. The focus lens tube 52 is slideably mounted within a focus sleeve 54. The exterior surface 56 (FIG. 4) of the focus lens tube 52 and the internal surface 58 (FIG. 3) of the focus sleeve 54, are finished to a sufficiently smooth finish to facilitate the sliding of the focus lens tube 52 within the focus sleeve 54. Clearance between the focus lens tube 52 and focus sleeve 54 is minimized to limit the possible tilt of the focus lens tube. Additionally, the focus lens tube 52 and focus sleeve 54 are sufficiently long so that the range of possible tilt, lateral shift, or rotation is minimized for a given clearance between a focus lens tube 52 and focus sleeve 54. The focus lens 50 preferably is a low diopter lens, thereby decreasing the sensitivity of the focusing assembly 48 to tilt, rotation, or decentration of the focus lens 50. A focus gimbal 60 is secured to the focus lens tube 52, preferably by a pair of pivot screws 62 passing through aperture 64 located on either side of the focus gimbal 60 and into apertures 66 defined within the focus lens tube 52. A pivot bearing 68 passes through an aperture 70 defined within the top of the focus gimbal 60. A linear actuator 72, which may be a barrel cam or unconstrained threaded member, defines a pivot bearing aperture 74 for receiving the pivot bearing 68, and a horizontal aperture 76, preferably threaded for receiving a focus screw 78 of a focus motor 80 as shown in FIG. 3. In some embodiments, a horizontally fixed post 82 may be secured within an aperture 84 defined within the bottom of the focus gimbal 60, also bearing against the surface of the focus lens tube 58 to secure the focus lens tube 52 within the focus gimbal 60. This method of attachment of the focus gimbal 60 to the focus lens tube 52 ensures that the linear motion of the focus gimbal 60, controlled by focus motor 80, is transferred to the focus lens tube 52 without rotating, tilting, or decentering the focus lens tube 52. The focus motor 80 may, in some alternative embodiments, be replaced with a manual focusing knob.

Figure 5:
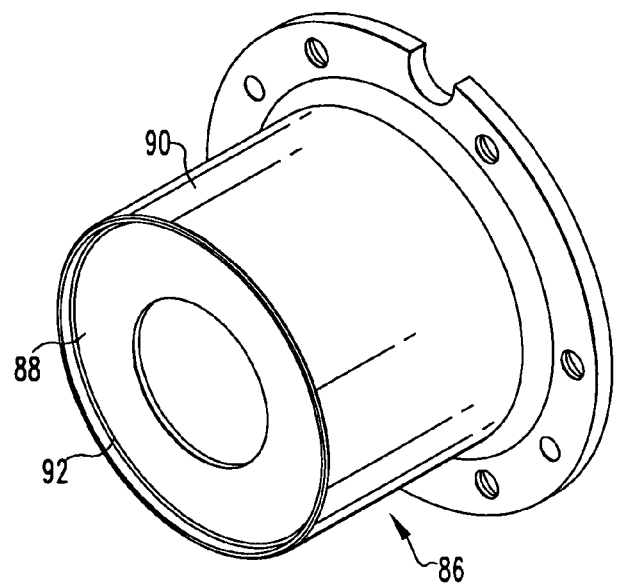
FIG. 5 is a front and side isometric view of an image intensifier and mount for use with a night sight of the present invention.
Figure 6:
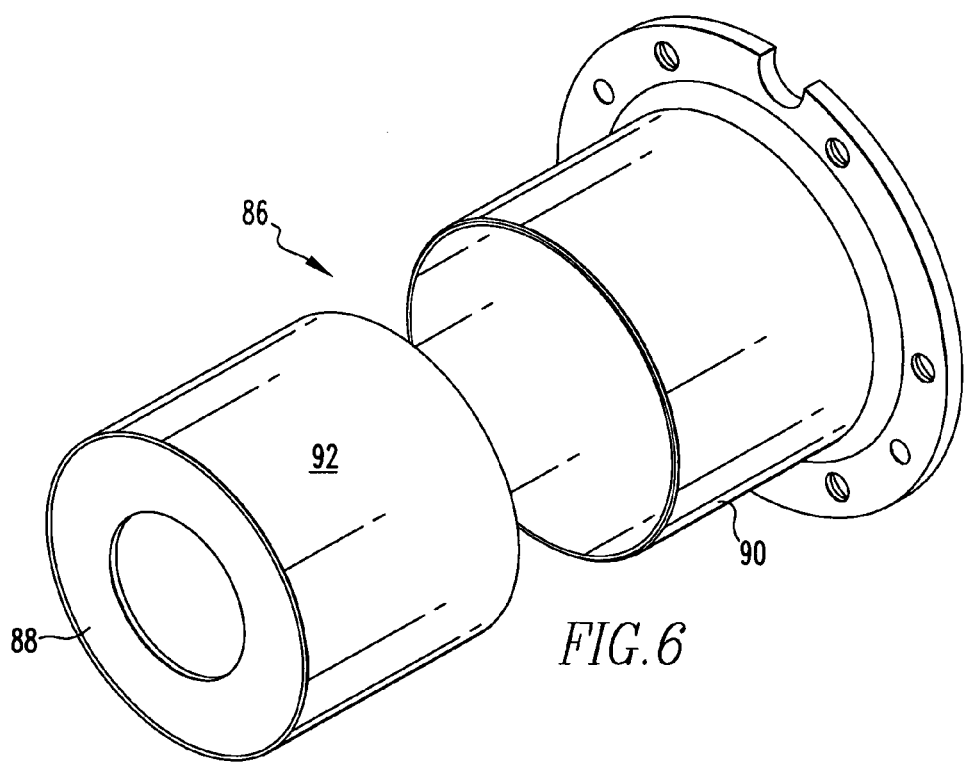
FIG. 6 is an exploded isometric front and side view of an image intensifier and mount for use with a night sight according to the present invention.

Referring back to FIG. 1 and also to FIGS. 5 and 6, an image intensifier assembly 86 is located behind the focusing assembly 48. The image intensifier assembly 86 includes an image intensifying sensor/display combination 88 held within an image intensifier mount 90. A preferred image intensifying sensor/display combination is a presently available image intensifier, but other alternative devices with which the invention may be used include uncooled detector arrays, lead salt detector arrays, short wave infrared detector arrays, visible band charge coupled display (CCD) arrays, and intensified CCD or CMOS arrays having direct, fiber, or optical coupling. Such displays include, for example, an inverting fiber optic output display, an LCD display, a micro mirror array, a CRT, a plasma display, or an OLED display, with an inverting fiber optic output display being most preferred.

The structure and functioning of an image intensifier 88 or other similar devices well-known, and therefore only briefly described herein. In the most preferred embodiments of an image intensifier, a photocathode having an electrical current flowing therethrough which forms the photosensitive surface of the image intensifier converts the optical image into an electronic image that is transmitted through an electron flow. The electrons are accelerated through the image intensifier, and remain focused because of the close proximity of surfaces within the image intensifier tube. Acceleration of the electrons, combined with a microchannel electron-multiplying plate, result in intensification of the original image. When the electrons reach a screen, the electronic image is converted to an optical image. The final, amplified visible image is displayed to the shooter or to other optical devices within the night sight.

A thin elastomer 92 surrounds the image intensifier 88. The elastomer 92 permits the image intensifier 88 to be tightly secured within the image intensifier mount 90, thereby resisting movement of the image intensifier 88 resulting from shock or temperature change, while also distributing the high mounting forces over the entire surface of the image intensifier 88, thereby resisting deformation of the image intensifier 88 over time from these high forces. The elastomer 92 further provides a degree of shock absorbance, thereby protecting the shock sensitive equipment within the image intensifier 88. Additionally, the elastomeric suspension of the image intensifier 88 within the image intensifier mount 90 compensates for different coefficients of thermal expansion within the material used for the image intensifier 88 and mounts 90, retaining the image intensifier 88 in its desired position despite expansion and contraction of the components.

A variety of elastomers 92 can be used to suspend the image intensifier 88 within the mount 90. Some examples include polysulfide, one-part or two-part liquid or paste silicones, epoxies, ethylene propylene diene rubber (EPDN), acrylonitrile-butadiene rubber (NBR), hydrogenated acrylonitrile-butadiene rubber (HNBR), chlorobutadiene rubber (CR), carboxylated nitrile rubber (XNBR), acrylate rubber (ACM), ethylene acrylic rubber (AEM), methyl polysiloxane (MQ), vinyl-methyl polysiloxane (VMQ), phenyl-vinyl-methyl polysiloxane (PVMQ), phenyl-methyl polysiloxane (PMQ), fluoromethyl polysiloxane (FVMQ), fluoro elastomer (FKM), perfluoro elastomer (FFKM), polyester-urethane rubber (AU), polyether-urethane rubber (EU), ethylene-oxide-epichlorhydrin rubber (ECO), polyepichlorohydrine (CO), chlorosulphonated polyethylene (CSM), natural rubber (NR), isoprene rubber (IR), polybutadiene rubber (BR), styrene-butadiene rubber (SBR), ethylene propylene copolymer (EPM), butyl rubber (IIR), chlorobutyl rubber (CIIR), and brominebutyl rubber (BIIR).

The intensified visible light image displayed on the inverting fiber optic output display 91 of the image intensifier 88 may pass through a corrector lens element 94 to better focus the image within the beam combiner 96, which will be described in greater detail below.

Figure 7:
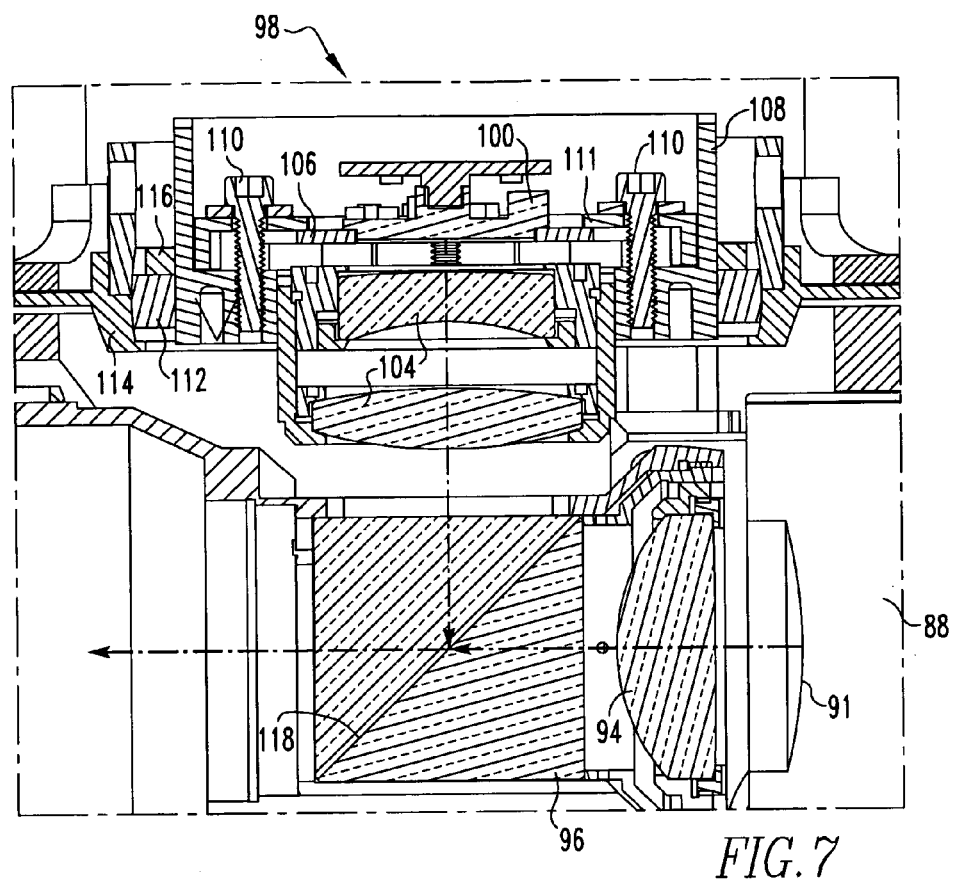
FIG. 7 is a side cross-sectional view of a display for an infrared image for use with a night sight according to the present invention.

Referring to FIGS. 1 and 7, the infrared display 98 is illustrated. The infrared display assembly 98 is preferably located adjacent to the top, one of the two sides, or the bottom of the beam combiner 96, and in the illustrated example is located adjacent to the top of the beam combiner 96. The beam combiner 96 is itself located directly behind the image intensifier assembly 86 and corrector lens element 94. The infrared display assembly 98 includes electronic infrared display 100. The infrared display 100 includes a display element 102 located above a display lens 104, adjacent to the beam combiner 96. The display element 102 may be, for example, an inverting fiber optic output display, an LCD display, a micro mirror array, a CRT, a plasma display, or an OLED display. During assembly of the night vision device 10, the distance between the display lens 104 and display element 102 will be adjusted to provide for proper focus, perceived distance, and overlay alignment of the infrared image entering the beam combiner 96. The infrared display 100, display element 102, and display lens 104 are secured within an infrared display carrier 106. The carrier 106 is itself secured within the adjustment ring 108 by a pair of screws 110, and may be moved or rotated in any horizontal direction by loosening the screws 110, and then retightening the screws 110 once the carrier 106 is in the desired position. The screws 110 may in some embodiments bear down on the washer plates 111, which in turn abut the display carrier 106. The adjustment ring 108 is retained in place by a spherical bearing 112 sitting between itself and a spherical bearing seat 114 defined within the housing 16. The use of the spherical bearing 112 permits the adjustment rings 108 to be moved vertically and/or tilted with respect to the beam combiner 96 during assembly of the night vision device 10, and then locked in place using the lock ring 116 sitting on top of the spherical bearing 112. This combination of locking adjustments permits the infrared display 100 to be secured within a position wherein the image projected by the display 100 overlays an image projected by the display 91 within the beam combiner 96.

The beam combiner 96 includes a dichroic surface 118 that is structured to reflect the wavelengths of light within the image from the infrared display 100, and to transmit the wavelengths of light utilized for the image from the display 91. In some preferred embodiments, the dichroic surface 118 will be structured to transmit green light without interference, and to reflect light having wavelengths other than those for green. The dichroic surface 118 is preferably oriented at an angle of about 45° to both the display 91 and the display 100, so that the image from the display 100 will be reflected about 90° as it is combined with the image from the display 91. The beam combiner 96 may be made from two mating components of a cube of glass, with the mating surfaces forming the about 45° angle surface upon which a dichroic coating is applied. Preferred dichroic coatings include CVD, dielectric, and rugate. Silvered or partial reflective beamsplitters may also be used, but are less preferred.

Figure 8:
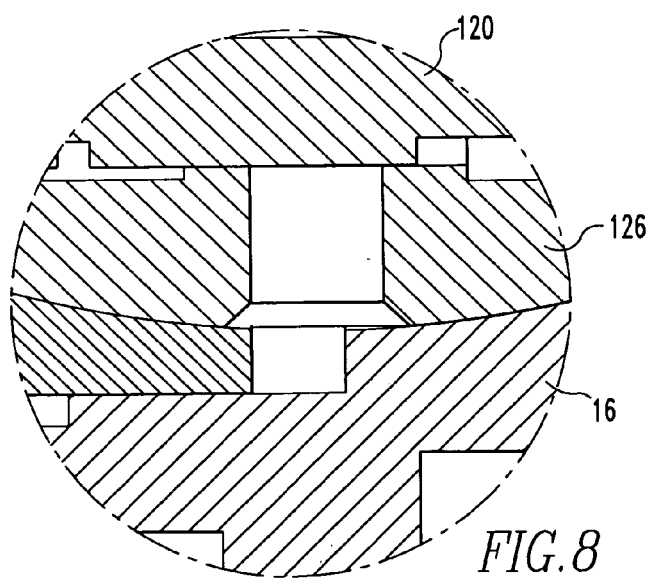
FIG. 8 is a side view of the detail labeled FIG. 8 and FIG. 1.

Referring back to FIG. 1, a collimator 120 is located behind the image intensifier 88, and directly ahead of sealing window 122 located at the back end 14 of the housing 16. The beam combiner 96 may be disposed at the forward end of the collimator 120. Collimators are well known in the art, and therefore not described in detail herein. The front end of the collimator 120 includes the focal length adjust lens 94, which is positioned during assembly of the collimator 120 to adjust the focal length of the collimator 120 to match the focal length of the objective lens 18. A spherical bearing 126 is installed within the housing 16 so that its center is centered substantially at the center of curvature of the inverting fiber optic output display 91. The collimator 120 is fitted within the spherical bearing 126 so that the angle at which the displayed image appears to emerge from the collimator 120 is the same angle at which the image entered the objective lens 18. The interaction of the spherical bearing 126, collimator 120, and housing 16 is best illustrated in FIG. 8. Alternatively, the spherical bearing 126 may be replaced by a risley prism assembly or fixed prism disposed behind the collimator 120 so that the displayed image appears at the correct angle.

Figure 9:
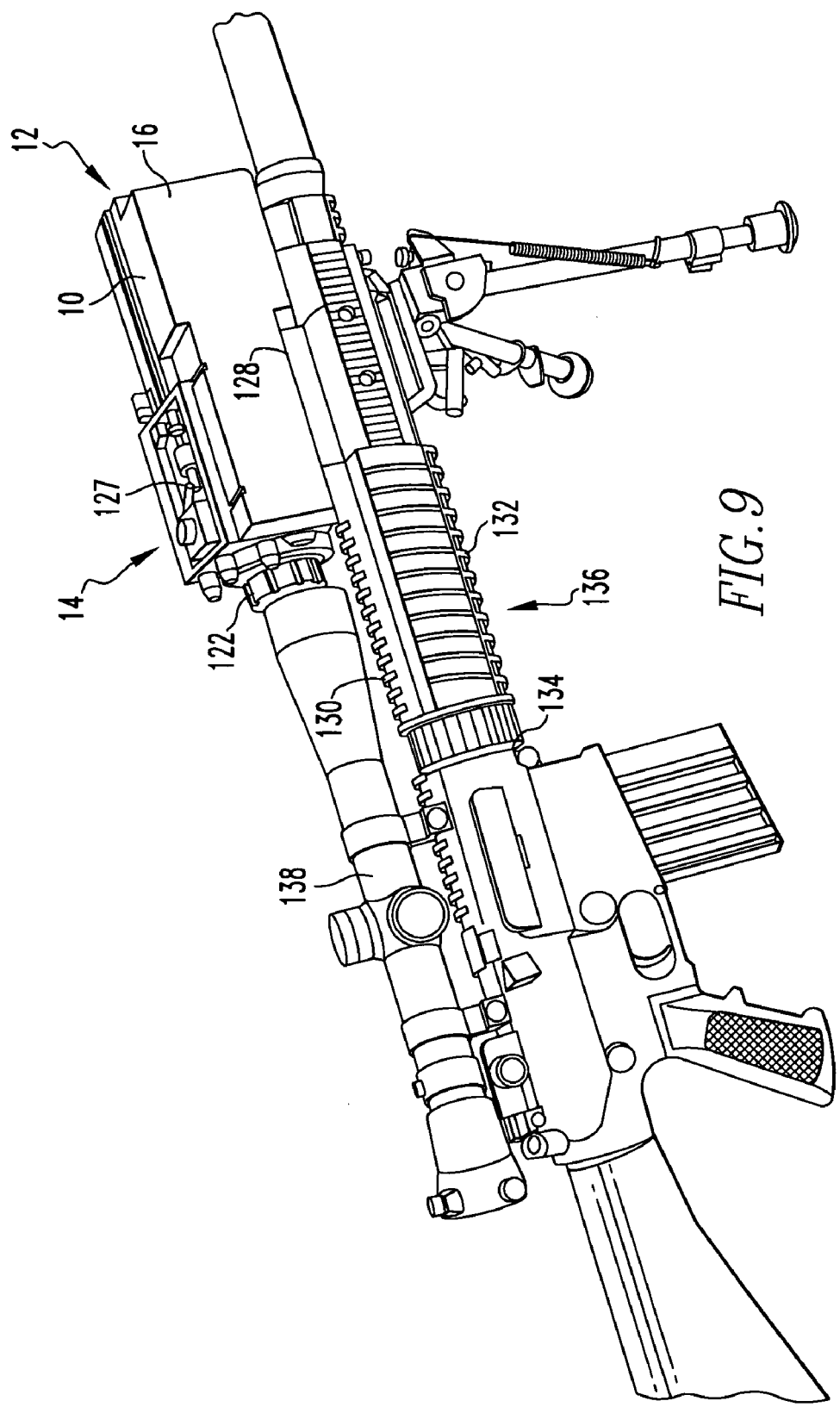
FIG. 9 is an environmental isometric side view of a night sight according to the present invention mounted on a firearm in front of a day scope.

Referring to FIGS. 1 and 9, the bottom of the housing 16 may include a mount 128 structured to secure the night vision device 10 to a universal sighting rail such as a weaver rail 130 that extends across the top of the forestock 132 and receiver 134 of the rifle 136.

The top of the night vision device 10 includes controls 127 for selecting either the image intensified image, the infrared image, or both simultaneously. The controls 127 further provide means for focusing the focusing assemblies 48, 36.

In use, the night vision device 10 may be mounted to the universal sight rail 130 of the rifle 136, possibly in front of the daytime telescopic sight 138 that is also mounted to the universal sight rail 130. Although preferred embodiments of the night vision device 10 are intended for use in conjunction with a telescopic daytime sight 138, those skilled in the art will recognize that the night vision device 10 could be equipped with its own reticle, and thereby used independently of the telescopic daytime sight 138. Additionally, the night vision device 10 may be utilized for night time viewing without being used for aiming a rifle 136. The unity magnification of the night vision device 10, combined with structures intended to ensure that images entering the multispectral objective lens 18 at a given angle exit the sealing window 122 at the same angle, will eliminate the need for exact alignment between the night vision device 10 and daytime telescopic sight 138.

As a shooter is aiming the rifle 136, light will pass through the multispectral objective lens 18, wherein it will be reflected off the primary mirror 46 towards the dichroic device 26. Visible/near infrared light will be reflected by the dichroic device 26 back towards the focusing assembly 48, wherein the focus lens 50 will bring the image into sharp focus on the photocathode at the front of the image intensifier 88. The photocathode converts the image to an electrical image, which is intensified as the electrons forming the image travel through the various electromagnetic fields that focus the electrons, resulting in acceleration of the electrons. The electrons are amplified by a micro-channel plate and proximity focused to a phosphorous screen. The amplified electronic image is then converted back to an optical image. The last step within the image intensifier is the inverting fiber optic output display 91, which displays the image to the beam combiner 96 through the lens 94. At the same time, infrared light will pass through the dichroic device 26, where it will be reflected by the mirror 30 towards the lens 34 and infrared camera 32. The infrared camera 32 will electronically transmit the infrared image to the display 100, wherein the display will be displayed as an image by visible wavelengths. The image will be transmitted through the lens 104 to the beam combiner 96. The image from the display 91 is transmitted to the beam combiner 96 as a green image which will pass through the dichroic surface 118. The image from the display 100 will consist of wavelengths other than green, which will be reflected off of the dichroic surface 118, being overlayed upon the image from the display 91 in a manner so that both images will appear to be a single image. The beam combiner 96 will display the overlayed image to the collimator 120. As the image passes through the collimator 120, it is made to appear as though it originated a long distance away. The final image is presented to the shooter as appearing to be a single image originating from substantially the same angle at which the image entered the multispectral objective lens 18. A night sight of the present invention can be constructed in a manner so that it introduces no more than one minute of angle error into aiming.

Alternatively, a user may select to utilize either the intensified visible/near infrared image only (for example, when there is amplified visible light), or the infrared image only (for example, when there is insufficient visible light to see even an intensified image), in which case only a single image will be presented to the beam combiner 96 and transmitted to the collimator 120. A user may wish to use the infrared image to locate targets, and then use the intensified image to identify them.

From the above description, it will become apparent to those skilled in the art that the lens 34 and infrared camera 32 could be positioned directly behind the dichroic device 26 within the obscured area 20 of the multispectral objective lens 18, thereby eliminating the need for the mirror 30. As another alternative, a dichroic beamsplitter may be placed directly between a refractive objective lens (with no obscured central area) and image intensifier, permitting visible light to pass through the dichroic device to the image intensifier while reflecting infrared light towards an infrared camera. Instead of focusing the visible image by moving the lens 50, the primary mirror 46 or the image intensifier 88 may be moved along an axis substantially parallel to the primary optical path of the night vision device 10. Additionally, depending on the type of image intensifier sensor/display combination 88 selected, the display 91 and display 100 may be combined into a single electronic display, wherein the images are electronically overlayed, thereby eliminating the need for the beam combiner 96.

The present invention therefore provides a night sight having the capability of producing either an intensified visible/near infrared image, an infrared image, or an infrared image overlayed upon a visible/near infrared image so that both images appear to be a single image to the viewer. The night vision device has a minimized sensitivity to tilt, decenter, and rotation of the focusing mechanism. The mass within the focus assembly that must be moved to focus the night vision device 10 has been minimized. The mounting of the image intensifier tube, infrared display, and collimator further ensures that the image is presented to the shooter at the proper angle. The night sight of the present invention has minimized sensitivity to relative misalignments between the night sight and the daytime telescopic sight.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A night vision device, comprising:
    a multispectral objective lens operable for receiving an image;
    a dichroic device structured to receive light from the multispectral objective lens and to separate the light into visible/near infrared light and infrared light, the visible/near infrared light comprising visible light and near infrared light;
    an image intensifying assembly structured to receive the visible/near infrared light from the dichroic device;
    an infrared camera structured to receive the infrared light from the dichroic device;
    at least one display structured to display an image transmitted from a device selected from the group consisting of the image intensifying assembly, the infrared camera, and a combination thereof; and
    a collimator structured to receive the displayed image and project and output the displayed image such that the projected image when viewed through the night vision device appears to originate from substantially the same angle at which the image entered the multispectral objective lens.

2. The night vision device according to claim 1, wherein the dichroic device includes an optical element having a coating thereon for separating the light into the visible/near infrared light and the infrared light.

3. The night vision device according to claim 1, further comprising a primary mirror structured to reflect light entering the night sight through the multispectral objective lens towards the dichroic device.

4. The night vision device according to claim 1, wherein the dichroic device is structured to reflect visible/near infrared light and to transmit infrared light.

5. The night vision device according to claim 4, wherein the dichroic device is structured to reflect visible/near infrared light towards the image intensifying assembly.

6. The night vision device according to claim 4, wherein the infrared camera is disposed within the path of infrared light passing through the dichroic device and sequentially after the dichroic device.

7. The night vision device according to claim 6, wherein the infrared camera is disposed substantially in line with the dichroic device.

8. The night vision device according to claim 6, further comprising a mirror structured to reflect infrared light passing through the dichroic device towards the infrared camera.

9. The night vision device according to claim 1, wherein the image intensifying device further comprises:
    an image intensifying sensor/display combination having an exterior surface;
    an image intensifier mount; and
    an elastomer between the sensor/display combination and image intensifier mount, the elastomer distributing mounting forces from the image intensifier mount over substantially the entire exterior surface of the sensor/display combination.

10. The night vision device according to claim 9, wherein the sensor/display combination is selected from the group consisting of an image intensifier, an uncooled infrared detector array, a cooled infrared detector array, a lead salt detector array, a SWIR detector array, a visible band CCD array, and an intensified CCD or CMOS array having direct, fiber, or optical coupling.

11. The night vision device according to claim 10, wherein the sensor/display combination has an output device selected from the group consisting of an inverting fiber optic output display, a LCD display, a micromirror array, a CRT, a plasma display, and an OLED display.

12. The night vision device according to claim 1, wherein the night vision device provides unity magnification of the image from input to output.

13. The night vision device according to claim 12, further comprising:
    means for adjusting the angle of the projected image from the collimator.

14. The night vision device according to claim 13, wherein the means for adjusting is centered substantially at a center of curvature of the at least one display.

15. The night vision device according to claim 1, wherein both the image intensifying assembly and infrared camera are operatively connected to a single display, the display being structured to electronically overlay a visible/near infrared image and an infrared image.

16. The night vision device according to claim 1:
    wherein the at least one display includes a visible/near infrared display structured to display an image from the image intensifying assembly, and an infrared display structured to display an image from the infrared camera; and
    further comprising a beam combiner structured to overlay an image from the visible/near infrared display with an image from the infrared display assembly.

17. The night vision device according to claim 16, further comprising:
    a housing; and
    an adjustment mechanism disposed between the infrared display assembly and the housing, the adjustment mechanism structured to permit adjustment of the angle of the infrared display assembly with respect to the beam combiner.

18. The night vision device according to claim 16, further comprising means for adjusting a position of the infrared display.

19. The night vision device according to claim 16, wherein the beam combiner includes a dichroic surface.

20. The night vision device according to claim 19, wherein the dichroic surface of the beam combiner is transparent to wavelengths transmitted by the image intensifying assembly and reflective to wavelengths transmitted by the infrared display.

21. The night vision device according to claim 20, wherein the dichroic coating of the beam combiner is transparent to green visible light and reflective to other wavelengths of visible light.

22. The night vision device according to claim 1, wherein the dichroic device is structured to direct the visible/near infrared light towards the image intensifying assembly and direct the infrared light towards the infrared camera.

23. The night vision device according to claim 22, wherein the infrared camera is disposed directly behind the dichroic device.

24. The night vision device according to claim 22, further comprising:
    a lens for receiving the visible/near infrared light directed from the dichroic device and focusing the received visible/near infrared light at the image intensifying assembly.

25. A method of making a night vision device, comprising:
    providing a multispectral objective lens operable for receiving an image;
    providing a dichroic device structured to receive light from the multispectral objective lens and to separate light into visible/near infrared light and infrared light, the visible/near infrared light comprising visible light and near infrared light;
    providing an image intensifying assembly structured to receive the visible/near infrared light from the dichroic device;
    providing an infrared camera structured to receive the infrared light from the dichroic device;
    providing an infrared display assembly structured to display an image transmitted from the infrared camera;
    providing a beam combiner structured to overlay an image from the image intensifying assembly with the image displayed from the infrared display assembly to generate a combined image;
    adjusting a position of the infrared display so that the image displayed from the infrared display assembly will be overlayed upon the image from the image intensifying assembly upon both images passing through the beam combiner; and
    providing a collimator structured to receive the combined image and project and output the combined image such that the projected combined image when viewed through the night vision device appears to originate from substantially the same angle at which the image entered the multispectral objective lens.

26. The method according to claim 25, further comprising:
    providing an adjustment mechanism, wherein the adjustment mechanism is structured to fit between the infrared display and a housing;
    securing the infrared display within the adjustment mechanism;
    aligning the adjustment mechanism with respect to the housing until the image displayed from the infrared display assembly overlays the image from the image intensifying assembly upon both images passing through the beam combiner; and
    locking the adjustment mechanism in place.

27. The method according to claim 25, further comprising:
    providing a means for adjusting the infrared display assembly with respect to the collimator;
    providing a translating mount adjacent to the beam combiner, the translating mount being structured to secure the infrared display therein;
    adjusting the translating mount with respect to the beam combiner until the image displayed from the infrared display assembly overlays the image from the image intensifying assembly upon both images passing through the beam combiner; and
    securing the translating mount in place.

28. A firearm, comprising:
    a barrel; and
    a night sight disposed above the barrel, the night sight comprising:
        a multispectral objective lens operable for receiving an image;
        a dichroic device structured to receive light from the multispectral objective lens and to separate light into visible/near infrared light and infrared light, the visible/near infrared light comprising visible light and near infrared light;
        an image intensifying assembly structured to receive the visible/near infrared light from the dichroic device;
        an infrared camera structured to receive the infrared light from the dichroic device;

an infrared display assembly structured to display an image transmitted from the infrared camera;
a beam combiner structured to overlay an image from the image intensifying assembly with the image displayed from the infrared display assembly; and
a collimator structured to receive the overlayed image and project and output the overlayed image such that the projected overlayed image when viewed through the night sight appears to originate from substantially the same angle at which the image entered the multispectral objective lens.

29. A night vision device, comprising:
a multispectral objective lens:
a dichroic device structured to receive light from the multispectral objective lens and to separate light into visible/near infrared light and infrared light:
an image intensifying assembly structured to receive visible/near infrared light from the dichroic device, the image intensifying assembly comprising,
an image intensifying sensor/display combination having an exterior surface,
an image intensifier mount, and
an elastomer between the sensor/display combination and image intensifier mount, the elastomer distributing mounting forces from the image intensifier mount over substantially the entire exterior surface of the sensor/display combination;
an infrared camera structured to receive infrared light from the dichroic device; and
at least one display structured to display an image transmitted from a device selected from the group consisting of the image intensifying assembly, the infrared camera, and a combination thereof.

30. The night vision device according to claim 29, wherein the sensor/display combination is selected from the group consisting of an image intensifier, an uncooled infrared detector array, a cooled infrared detector array, a lead salt detector array, a SWIR detector array, a visible band CCD array, and an intensified CCD or CMOS array having direct, fiber, or optical coupling.

31. The night vision device according to claim 30, wherein the sensor/display combination has an output device selected from the group consisting of an inverting fiber optic output display, a LCD display, a micromirror array, a CRT, a plasma display, and an OLED display.

32. A night vision device, comprising:
a multispectral objective lens:
a dichroic device structured to receive light from the multispectral objective lens and to separate light into visible/near infrared light and infrared light:
an image intensifying assembly structured to receive visible/near infrared light from the dichroic device;
an infrared camera structured to receive infrared light from the dichroic device;
at least one display structured to display an image transmitted from a device selected from the group consisting of the image intensifying assembly, the infrared camera, and a combination thereof;
a collimator structured to receive light transmitted from the at least one display;
a housing; and
a spherical bearing disposed between the housing and the collimator; the spherical bearing being structured to permit adjustment of the angle of the collimator with respect to the housing.

33. The night vision device according to claim 32, wherein the spherical bearing is centered substantially at a center of curvature of the at least one display.

34. A night vision device, comprising:
a multispectral objective lens:
a dichroic device structured to receive light from the multispectral objective lens and to separate light into visible/near infrared light and infrared light:
an image intensifying assembly structured to receive visible/near infrared light from the dichroic device;
an infrared camera structured to receive infrared light from the dichroic device;
at least one display structured to display an image transmitted from a device selected from the group consisting of the image intensifying assembly, the infrared camera, and a combination thereof, and wherein the at least one display includes a visible/near infrared display structured to display an image from the image intensifying assembly, and an infrared display structured to display an image from the infrared camera;
a beam combiner structured to overlay an image from the visible/near infrared display with an image from the infrared display assembly;
a housing; and
a spherical bearing disposed between the infrared display assembly and the housing, the spherical bearing being structured to permit adjustment of the angle of the infrared display assembly with respect to the housing.

35. A method of making a night vision device, comprising:
providing a multispectral objective lens;
providing a dichroic device structured to receive light from the multispectral objective lens and to separate light into visible/near infrared light and infrared light;
providing an image intensifying assembly structured to receive visible/near infrared light from the dichroic device;
providing an infrared camera structured to receive infrared light from the dichroic device:
providing an infrared display assembly structured to display an image transmitted from the infrared camera;
providing a beam combiner structured to overlay an image from the image intensifying assembly with the image displayed from the infrared display assembly;
adjusting a position of the infrared display so that the image displayed from the infrared display will be overlayed upon the image from the image intensifying assembly upon both images passing through the beam combiner;
providing a spherical seat;
providing a spherical bearing structured to fit between the infrared display and the spherical seat;
securing the infrared display within the spherical bearing;
rotating the spherical bearing with respect to the spherical seat until the image displayed from the infrared display overlays the image from the image intensifying assembly upon both images passing through the beam combiner; and
securing the spherical bearing in place.

36. A method of making a night vision device, comprising:
providing a multispectral objective lens;
providing a dichroic device structured to receive light from the multispectral objective lens and to separate light into visible/near infrared light and infrared light;

providing an image intensifying assembly structured to receive visible/near infrared light from the dichroic device;

providing an infrared camera structured to receive infrared light from the dichroic device:

providing an infrared display assembly structured to display an image transmitted from the infrared camera;

providing a beam combiner structured to overlay an image from the image intensifying assembly with the image displayed from the infrared display assembly;

adjusting a position of the infrared display so that the image displayed from the infrared display assembly will be overlayed upon the image from the image intensifying assembly upon both images passing through the beam combiner;

providing a means for linear adjustment of the collimator with respect to the infrared display assembly;

providing a translating mount adjacent to the beam combiner, the translating mount being structured to secure the infrared display therein;

adjusting the translating mount with respect to the beam combiner until the image displayed from the infrared display overlays the image from the image intensifying assembly upon both images passing through the beam combiner; and securing the translating mount in place.

* * * * *

UNITED STATES PATENT AND TRADEMARK OFFICE
CERTIFICATE OF CORRECTION

| | | |
|---|---|---|
| PATENT NO. | : 7,333,270 B1 | Page 1 of 1 |
| APPLICATION NO. | : 11/150377 | |
| DATED | : February 19, 2008 | |
| INVENTOR(S) | : Eugene Pochapsky and Scott Keitzer | |

It is certified that error appears in the above-identified patent and that said Letters Patent is hereby corrected as shown below:

Column 1, line 38, delete "locus" and insert -- focus --.

Column 6, line 40, first occurrence, delete "dichiroic" and insert -- dichroic --.

Column 6, line 40, second occurrence, delete "dichiroic" and insert -- dichroic --.

Column 6, line 41, delete "dichiroic" and insert -- dichroic --.

Signed and Sealed this

Twelfth Day of August, 2008

JON W. DUDAS
*Director of the United States Patent and Trademark Office*